(12) United States Patent
Schmidt et al.

(10) Patent No.: US 7,668,418 B2
(45) Date of Patent: Feb. 23, 2010

(54) MACHINE WITH DATA TRANSFER FROM ONE MACHINE PART TO ANOTHER MACHINE PART WHICH IS ABLE TO BE ROTATED RELATIVE TO THE ONE MACHINE PART

(75) Inventors: Richard Schmidt, Baiersdorf (DE);
Günter Schwesig, Erlangen (DE);
Ulrich Wetzel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/316,691

(22) Filed: Dec. 16, 2008

(65) Prior Publication Data
US 2009/0154875 A1    Jun. 18, 2009

(30) Foreign Application Priority Data
Dec. 17, 2007    (EP) .................................. 07024425

(51) Int. Cl.
G02B 6/26    (2006.01)
G02B 6/42    (2006.01)
(52) U.S. Cl. .......................................... 385/26; 385/25
(58) Field of Classification Search ................ None
See application file for complete search history.

(56) References Cited

U.S. PATENT DOCUMENTS

| 4,190,318 | A | 2/1980 | Upton, Jr. |
| 7,260,301 | B2* | 8/2007 | Barth et al. .................. 385/135 |
| 7,526,155 | B2* | 4/2009 | Hirohashi et al. ............. 385/26 |

FOREIGN PATENT DOCUMENTS

DE    3409809 A1    9/1985

* cited by examiner

*Primary Examiner*—Tina M Wong

(57) ABSTRACT

A machine having two machine parts, of which one is able to be rotated relative to the other, in which light signals are transferred from the one part to the other part. The light signals are transmitted radially to the axis of rotation of the rotatable machine part. In a first embodiment a plurality of light sources couple light into an optical waveguide ring which is coupled out over the entire outer circle of the optical waveguide ring so that it is guaranteed that light signals reach a receiver arranged radially outside in each case. In another embodiment light sources couple light into optical waveguide structures, with branches of the optical waveguides guaranteeing that on the outer circle of the one component the exit points for light are sufficiently dense that for any given angular position of the rotatable component at least one of two receivers receives a light signal.

6 Claims, 3 Drawing Sheets

MACHINE WITH DATA TRANSFER FROM ONE MACHINE PART TO ANOTHER MACHINE PART WHICH IS ABLE TO BE ROTATED RELATIVE TO THE ONE MACHINE PART

Machine with data transfer from one machine part to another machine part which is able to be rotated relative to the one machine part.

CROSS REFERENCE TO RELATED APPLICATIONS

This application claims priority of European Patent Office application No. 07024425.6 EP filed Dec. 17, 2007, which is incorporated by reference herein in its entirety.

FIELD OF INVENTION

The invention relates to a machine with data transfer from one machine part to another machine part which is able to be rotated relative to the one machine part.

BACKGROUND OF THE INVENTION

U.S. Pat. No. 4,190,318 discloses a machine, especially a slip ring, with a machine part which is supported in a second machine part. In this case the two machine parts are able to be rotated relative to each other around a common axis of rotation. A number of light-emitting diodes are attached in this case to the rotating machine part and emit light for data transmission through different optical channels to photodetectors which are arranged on the stationary machine part. The light is emitted in such cases in the radial direction in relation to the axis of rotation of the machine and forms a continuous ring which is used for the data transmission.

DE 34 09 809 A1 discloses a transmit and/or receive apparatus for electromagnetic radiation, in which optical signals are used to transmit data between a rotatable and a stationary area of a transmit and/or receive apparatus. This patent discloses an optical waveguide splitter with the aid of which optical signals can be transmitted from one or more optoelectrical converter(s) into an optical waveguide or out of said waveguide.

SUMMARY OF INVENTION

The problem arising here is that for machines with a first machine part and a second machine part which is able to be rotated relative to the first machine part around an axis of rotation, data has to be transferred from the one machine part to the other machine part, if necessary also back again to the other machine part from the one machine part. The requirements arise especially with modern machines, in which field bus signals must be transferred. In such cases the data is to be transferred using light signals, so that at least one light source is provided at the one machine part and at least on light receiver is provided at the other machine part.

The optical communication can be effected in a simple manner if light source and light receiver can be arranged on the axis of rotation, since then precisely one light source light can send to precisely one light receiver. Frequently however the rotatable machine part rotates via a hollow shaft. The problem arising here is that light must arrive at a light receiver at any given angle. This means that light must be emitted over a entire ring which encloses the hollow shaft. Previously it has been helpful to provide a plurality of light sources and then convey the light in an axial direction such that it widens out into an illuminating ring. With this embodiment however a relatively large amount of space is lost in an axial direction in the machine for the arrangement to widen out the light beams.

An object of the invention is to provide a machine of the generic type stated at the outset which can be built relatively short and simply and with which energy is saved.

The object is achieved by a machine as claimed in the claims.

The arrangement between the light sources and the light receivers is designed so that the light signals will be transmitted in a radial direction to the axis of rotation. Thus the problem that one has here is also that the light beams of the individual light sources must be widened out, but also that this widening out naturally occurs in a radial direction, so that a short machine can be built.

The light is coupled in from a plurality of light sources into a branching optical waveguide structure and then individual optical waveguide branches end at the edge of the one machine part. Light thus exits from the optical waveguide branch ends not over the entire extent of a circle but merely in individual points of the circle. It is guaranteed however that the light arrives on the receive side if at least two receivers are provided, and indeed only the number of the ends of the optical waveguide branches must be sufficiently large and their angular spacings suitably adapted to the number and to the angular spacing of the receivers. The ends of the optical waveguide branches and the receivers are adapted to each other such that for each angular position light reaches a receiver from at least one optical waveguide branch end. This ensures that light signals arrive from the transmitter at the receiver at any given angular position and data transmission is not interrupted.

Such an optical waveguide structure can be provided on a carrier substrate, but is especially simple to fabricate if it is integrated into a circuit board, with electronic components then also being able to be provided on the circuit board which can serve to create and evaluate its signals.

It must be ensured in any case that light reaches at least one receiver from at least one light source, so that data transfer is guaranteed. This means that with specific angular positions the light from one or two of the light sources is sufficient and the light of the remaining light sources remains unused. In a preferred embodiment of the invention the light sources are controlled by a control unit which in each case only causes some of the light sources to emit light simultaneously. This means that energy is then saved. This part of the light sources is preferably defined depending on an angular position of the second machine part, and is defined in such a way that only those light sources are made to emit light of which the light reaches a receiver at a said angular position.

As already shown above, the invention is especially suitable for the case in which the second machine part is rotatable via a hollow shaft.

The inventive principle can also be used with bidirectional data transmission (data exchange). Then only at least one additional light receiver must also be arranged on the one machine part, and at least one light source must also be arranged on the other machine part at which a light receiver is arranged.

The actual embodiment does not differ fundamentally in the case of bidirectional communication from the system for unidirectional data transfer. This can be executed especially simply by light being emitted radially outwards on a front side of the machine parts and light being emitted radially inwards on a rear side.

The invention includes the provision of a method for transfer of light signals for data transfer from a first to a second machine part, of which one machine part is able to be rotated in relation to the other around an axis of rotation, in which inventively the light signals are transferred radially to the axis of rotation. The preferred embodiment is that in which the light signals are transferred radially outwards. The latter is especially the case if the rotating machine part is coupled to a hollow shaft and lies radially further in than a stationary machine part coupled to a housing if necessary.

BRIEF DESCRIPTION OF THE DRAWINGS

Preferred embodiments of the invention and embodiments are described below in relation to the drawings, in which.

DETAILED DESCRIPTION OF INVENTION

Figure 1:
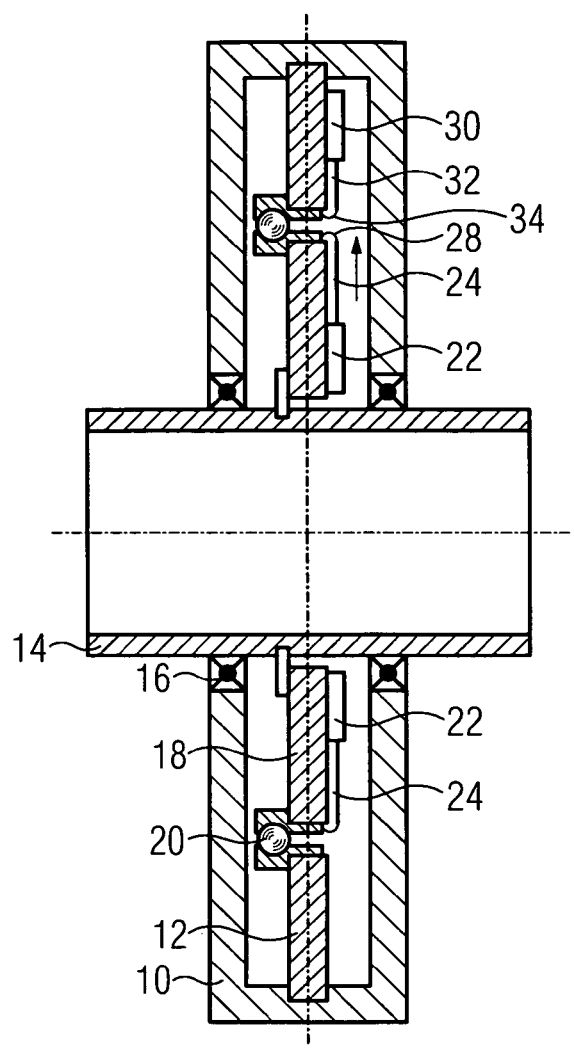
FIG. 1 shows a section through a first embodiment.

A machine features a first machine part which remains motionless at the installation location of the machine and also a second machine part which rotates relative to the first machine part. The first machine part includes a housing 10 to which a carrier plate 12 is attached. The second machine part includes a hollow shaft 14 which is arranged via bearings 16 to rotate relative to the housing 10 and on which a carrier plate 18 is arranged. The carrier plates 12 and 18 are coupled to each other via a floating bearing 20. In this case data is to be sent from the rotatable machine part to the non-rotatable machine part. To this end a plurality of light sources 22 is provided on the carrier plate 18 which couple light into a ring 24 which lets light pass through. The translucent ring 24 is made of optical waveguide material and can transport light coupled in via its inner circle to its outer circle. The width of the ring 24 and the number of light sources 22 are selected so that a optical waveguide ray bundle 26 which leaves a light source 22 overlaps with an optical ray bundle sent out from one of the neighboring light sources 22 at least at the outer edge defined by the outer circle of the ring 24. At the outer edge of the ring 24 is embodied a type of lens structure 28 which makes it easier for light to exit at the outer edge. Two receivers 30 are now arranged in this diagram on the carrier plate 12, and optical waveguide material 32 is likewise arranged in front of these 30 receivers, with this also being able to be provided as a ring or as a part ring (ring segment). A lens-like structure 34 is now likewise arranged on the optical waveguide material which serves to couple back in light escaping from the lens-like structure 28 and to direct it into the optical waveguide material 32 and thereby to the receiver 30.

Figure 2:
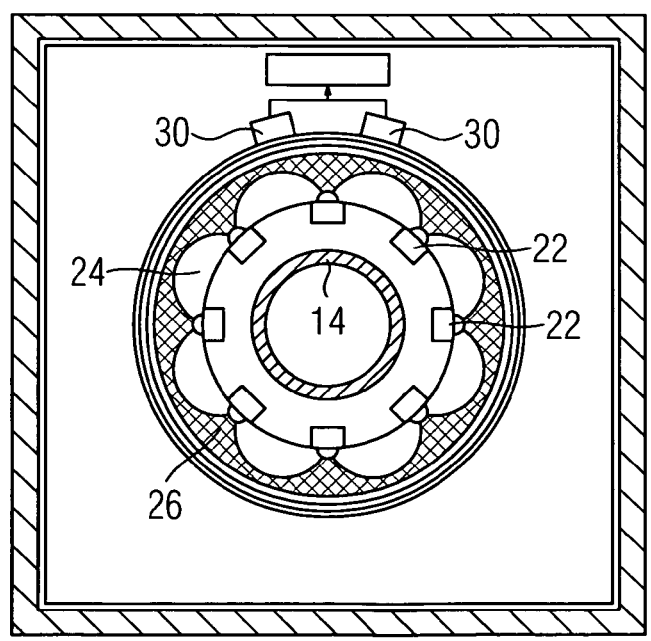
FIG. 2 shows an overhead view of the embodiment from FIG. 1.
Figure 3:
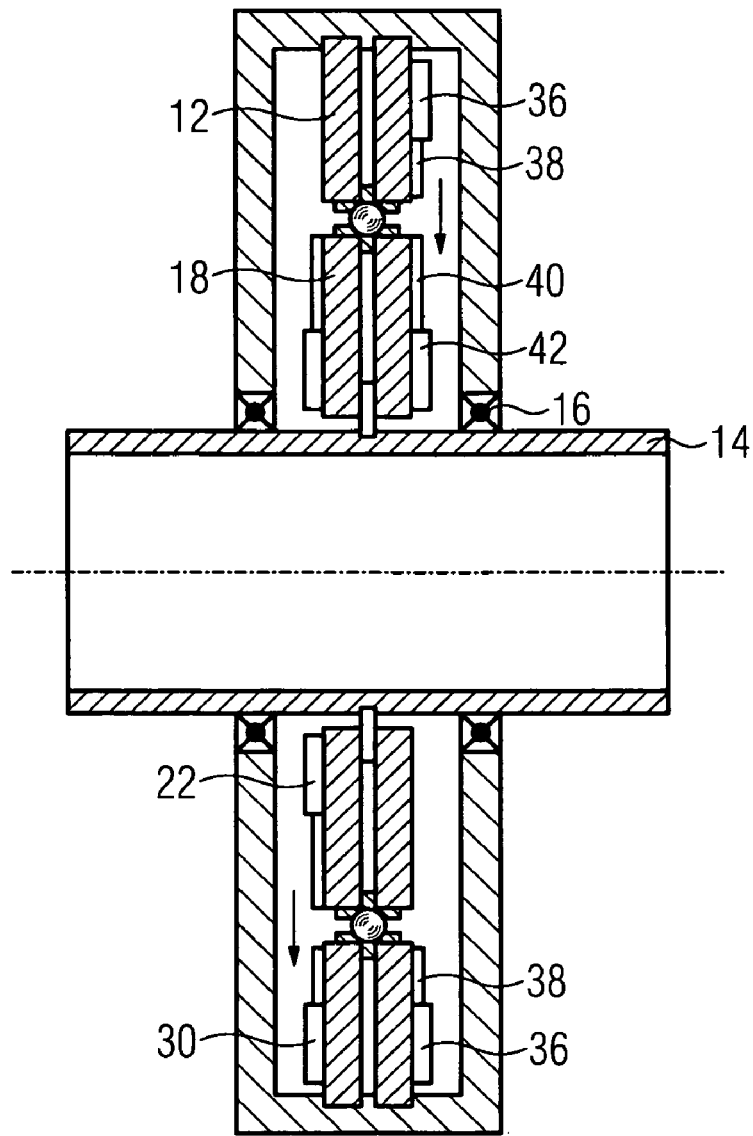
FIG. 3 shows a section through an embodiment expanded in relation to the embodiment from FIG. 1.

In the embodiment in accordance with FIG. 1 and FIG. 2 the light sources 22 sit radially inside and the light receivers 30 radially outside. It is however possible to provide an exactly reversed arrangement, i.e. to place the receivers to the radial inside and the light sources to the radial outside. In the embodiment in accordance with FIG. 3 both principles are realized simultaneously: The left-hand side of the carrier plates 12 and 18 in FIG. 3 corresponds exactly to FIG. 1. By contrast, on the rear side of the carrier plates 12 and 18 the stated reverse embodiment is embodied, namely a plurality of transmitters 36 radially outside which couple light into an optical waveguide 38 which is coupled into an optical waveguide 40 and reaches a receiver 42 on the rear of the carrier plate 18. FIG. 3 thus enables bidirectional data communication.

Figure 4:
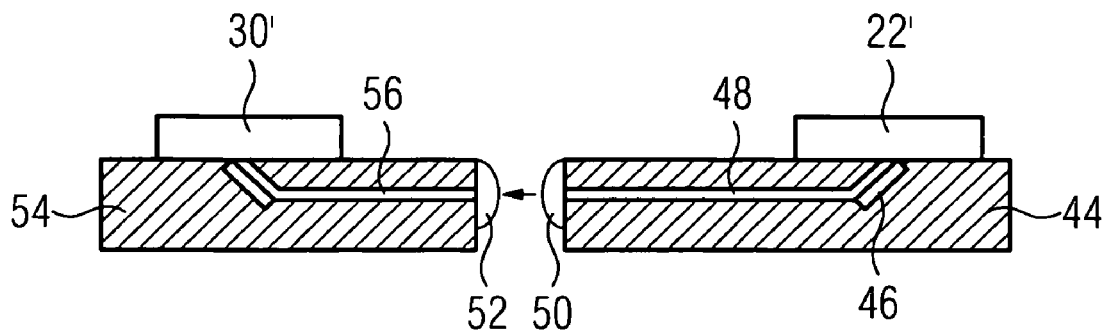
FIG. 4 illustrates a principle used for an embodiment of the invention and FIG. 5 to FIG. 7 show overhead views of the embodiment of the invention in the fashion of FIG. 2.

In the embodiments in accordance with FIG. 1 to FIG. 3 the light sources 22 or 36 couple the light radially into optical waveguide circuit boards 24 or 38. There is now provision in an inventive embodiment, instead of a plate 24 through which light can pass, to use individual optical waveguides, and indeed these are preferably embedded in a circuit board 44, as is shown in FIG. 4. A light source 22' emits light into the circuit board 44 where it is reflected by a mirror 46 and coupled into an optical waveguide 48. Via a lens-like structure 50 the light exits in the gap between the two machine parts, it then enters again via a lens-like structure 52 into a circuit board 54, namely especially into an optical waveguide 56 located there and reaches the receiver 30'.

The optical waveguides 46 or 56 are split. This is illustrated for the optical waveguide 46 in FIG. 5: Starting from the light source 22'0 the light runs radially and then goes to a splitter in two optical waveguide branches, in which it splits once more etc., until it exits at optical waveguide ends 58 at the outside circle of the carrier plate 18. In this embodiment, unlike in the embodiment in accordance with FIG. 2, the entire outer circle 58 of the carrier plate 18 is no longer irradiated or able to be irradiated. In order to now guarantee that light from a light source 22' reaches a receiver 30' each time, on the one hand such receivers 30' can be used which scan a predetermined angular range, which for example corresponds to a space between two optical waveguide ends 58. The distances between the optical waveguide ends 58 on the one hand and the distances between the two receivers 30' on the other hand are selected so that light always reaches a receiver 30' from one optical waveguide end 58. With a clever choice of optical waveguide branches the number of the light sources 22' can be reduced by comparison with the embodiment in accordance with FIG. 2, cf. especially FIG. 6 for which a more complex splitting is selected.

Figure 5:
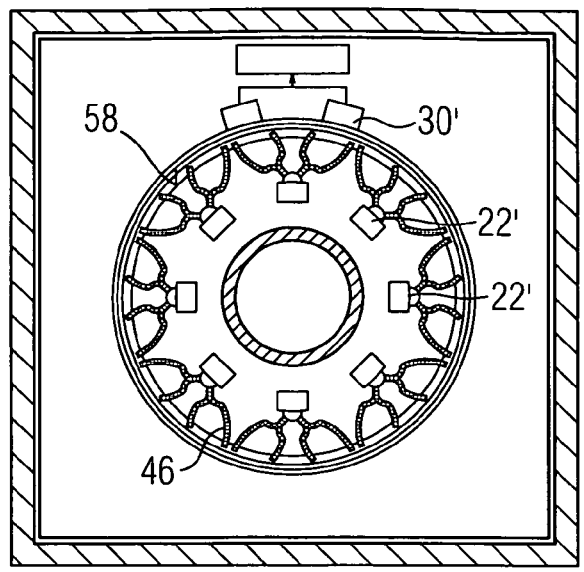
Figure 6:
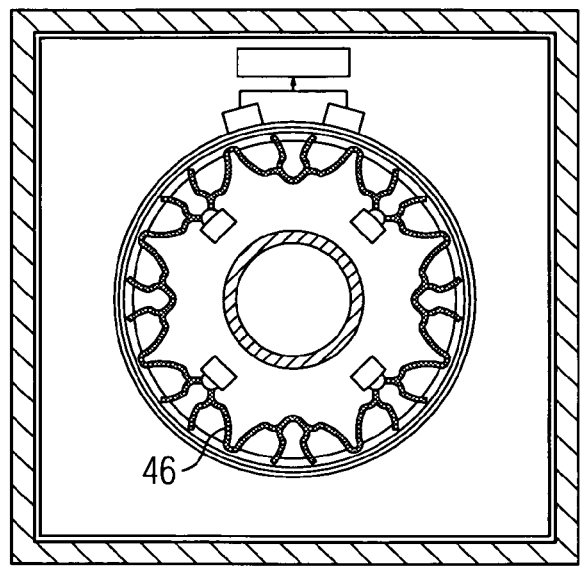
Figure 7:
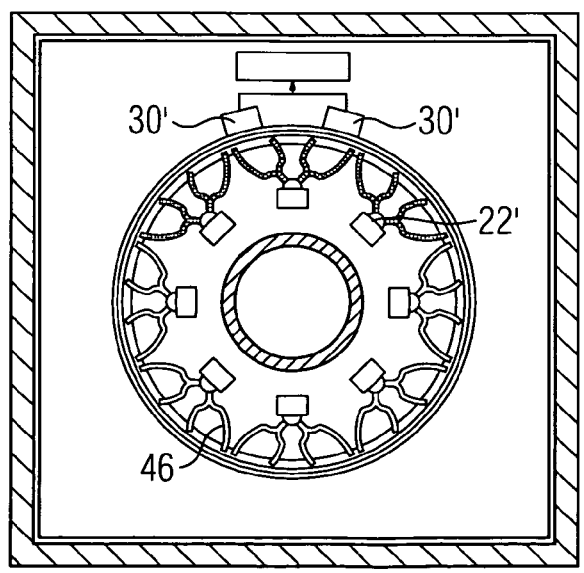

The striking aspect both in the embodiment in accordance with FIG. 2 and also in the inventive embodiment in accordance with FIG. 5 or FIG. 6 is that some of the light sources 22 or 22' emit light in a direction lying away from the receivers 30 or 30'. This light is lost for data exchange. It is not easy to provide energy for light sources 22 and 22' on a rotating component. This energy should not be wasted. For this purpose the light sources 22 or 22' are preferably activated so that only the light sources 22' located in the area of the receivers 30' emit light and the other light sources do not. This is able to be implemented both for the embodiment in accordance with FIG. 2 and also in accordance with FIG. 5, but especially for the inventive embodiment in accordance with FIG. 5 shown in FIG. 7: In FIG. 7 the upper three light sources 22' emit light and the other light sources do not emit any light. If the carrier plate 18 rotates because the hollow shaft 14 is rotating, other light sources 22' are selected in each case, which emit light, namely especially always those which send light to the receivers 30'.

Common to the embodiments of the invention is that a way is demonstrated of how the light can be transmitted from a stationary to a rotating machine part or vice versa in the radial direction. This makes it possible to arrange the machine parts so that the one surrounds the other, so that in an axial direction space is obtained, i.e. a short machine is built.

The invention claimed is:

1. A machine, comprising:
a first machine part;
a second rotating machine part, which rotates relative to the first machine part around an axis of rotation;
a plurality of light sources provided on the second rotating machine part for outputting light signals for a data transfer;
light receivers for receiving the light signals located on the first machine part, the light source and the light receiver being arranged such that the light signals are transmitted in a radial direction to the axis of rotation,
a branching optical waveguide structure,
wherein the plurality of light sources couple light into the branching optical waveguide structure, individual optical waveguide branches ending at the edge of the second rotating machine part, ends of the optical waveguide branches and their angular spacing being selected suitable for the number and angular spacing of the receivers so that for each angular position light from at least one optical waveguide branch end reaches a receiver,
wherein the plurality of light sources are activated by a control unit which only causes some of the light sources to output light simultaneously, and
wherein the control unit selects the part of the light sources caused to output light simultaneously as a function of an angular position of the second rotating machine part such that only those light sources of which the light reaches a receiver at the angular position are made to output light.

2. The machine as claimed in claim 1, wherein the second rotating machine part rotates via a hollow shaft.

3. The machine as claimed in claim 1, wherein both light receivers and light sources are arranged on the first machine part and the second rotating machine part, so that bidirectional communication between the first and the second rotating machine part is enabled.

4. A machine, comprising:
a first machine part;
a second rotating machine part, which rotates relative to the first machine part around an axis of rotation;
a plurality of light sources provided on the second rotating machine part for outputting light signals for a data transfer;
light receivers for receiving the light signals located on the first machine part, the light source and the light receiver being arranged such that the light signals are transmitted in a radial direction to the axis of rotation,
a branching optical waveguide structure,
wherein the plurality of light sources couple light into the branching optical waveguide structure, individual optical waveguide branches ending at the edge of the second rotating machine part, ends of the optical waveguide branches and their angular spacing being selected suitable for the number and angular spacing of the receivers so that for each angular position light from at least one optical waveguide branch end reaches a receiver,
wherein the branching optical waveguide structure is integrated in a circuit board,
wherein the plurality of light sources are activated by a control unit which only causes some of the light sources to output light simultaneously, and
wherein the control unit selects the part of the light sources caused to output light simultaneously as a function of an angular position of the second rotating machine part such that only those light sources of which the light reaches a receiver at the angular position are made to output light.

5. The machine as claimed in claim 4, wherein both light receivers and light sources are arranged on the first machine part and the second rotating machine part, so that bidirectional communication between the first and the second rotating machine part is enabled.

6. The machine as claimed in claim 4, wherein the second rotating machine part rotates via a hollow shaft.

* * * * *